US008364076B2

(12) United States Patent
Eum et al.

(10) Patent No.: US 8,364,076 B2
(45) Date of Patent: Jan. 29, 2013

(54) APPARATUS AND METHOD OF FEEDBACK CANCELLATION FOR RADIO SIGNAL

(75) Inventors: Ho-Min Eum, Daejeon (KR);
Heung-Mook Kim, Daejeon (KR);
Hyoung-Nam Kim, Busan (KR);
Yong-Gu Jo, Busan (KR)

(73) Assignees: Electronics and Telecommunications Research Institute, Daejeon (KR);
Institute for Research & Industry Cooperation, PNU, Busan (KR)

( * ) Notice: Subject to any disclaimer, the term of this patent is extended or adjusted under 35 U.S.C. 154(b) by 203 days.

(21) Appl. No.: 12/884,805

(22) Filed: Sep. 17, 2010

(65) Prior Publication Data

US 2011/0070839 A1  Mar. 24, 2011

(30) Foreign Application Priority Data

Sep. 18, 2009  (KR) .................. 10-2009-0088742
Dec. 21, 2009  (KR) .................. 10-2009-0128534

(51) Int. Cl.
*H04B 7/14* (2006.01)

(52) U.S. Cl. ......... 455/24; 455/7; 455/8; 455/9; 455/10; 455/11.1; 455/63.1; 455/114.2; 455/296; 375/211; 375/213; 375/215

(58) Field of Classification Search ............... 455/7–10, 455/11.1, 24, 63.1, 68–70, 114.2, 296; 375/211, 375/213, 215
See application file for complete search history.

(56) References Cited

U.S. PATENT DOCUMENTS

| | | | | |
|---|---|---|---|---|
| 7,831,203 | B2 * | 11/2010 | Lee et al. | 455/22 |
| 7,873,315 | B2 * | 1/2011 | Ma et al. | 455/11.1 |
| 8,068,783 | B2 * | 11/2011 | Braithwaite et al. | 455/24 |
| 8,073,385 | B2 * | 12/2011 | Braithwaite et al. | 455/9 |
| 8,150,309 | B2 * | 4/2012 | Braithwaite | 455/7 |
| 2004/0237117 | A1 | 11/2004 | Park et al. | |

(Continued)

FOREIGN PATENT DOCUMENTS

| EP | 1239610 | * 11/2002 |
|---|---|---|
| EP | 1931063 | * 11/2008 |

(Continued)

OTHER PUBLICATIONS

Seung Won Kim et al., "Equalization Digital On-Channel Repeater in the Single Frequency Networks", IEEE Transactions on Broadcasting, vol. 52, No. 2, pp. 137-146, Jun. 2006.

(Continued)

*Primary Examiner* — Tuan A Tran
(74) *Attorney, Agent, or Firm* — Rabin & Berdo, P.C.

(57) ABSTRACT

A feedback signal cancellation apparatus includes a first RF receiver configured to down-convert a received RF signal to a predetermined frequency band, a subtractor configured to subtract a replica of a feedback signal from the down-converted signal, a transmission signal generator configured to generate a repeater output signal using a feedback cancelled signal, a RF transmitter configured to transmit the repeater output signal, a second RF receiver configured to down-convert a RF signal outputted from the RF transmitter to a predetermined frequency band, a reference signal generator configured to receive the RF signal and generate a reference signal having no DC pilot, and a replica generator configured to generate a filter coefficient using correlation between the feedback cancelled signal and the reference signal and to generate a replica of the feedback signal using the generated filter coefficient and the down-converted signal of the second RF receiver.

11 Claims, 11 Drawing Sheets

U.S. PATENT DOCUMENTS

| | | | |
|---|---|---|---|
| 2009/0197541 A1* | 8/2009 | Crilly et al. | 455/69 |
| 2009/0291632 A1* | 11/2009 | Braithwaite et al. | 455/7 |
| 2010/0075595 A1* | 3/2010 | DeMarco et al. | 455/11.1 |
| 2010/0109771 A1* | 5/2010 | Baik et al. | 330/149 |
| 2010/0118922 A1* | 5/2010 | Ahn | 375/214 |
| 2010/0167639 A1* | 7/2010 | Ranson et al. | 455/24 |

FOREIGN PATENT DOCUMENTS

| | | |
|---|---|---|
| GB | 2426415 A | 9/2009 |
| KR | 2004-0099878 A | 12/2004 |
| KR | 10-0873486 | 12/2008 |
| KR | 10-0902334 A | 6/2009 |
| KR | 10-0902336 A | 6/2009 |
| WO | WO-2009/061084 A1 | 5/2009 |

OTHER PUBLICATIONS

Young-Jun Lee et al., "A Design of a Feedback Canceller for Equalization Digital On-Channel Repeater of the ATSC System", 59th Annual IEEE Broadcast Symposium, Oct. 16, 2009.

* cited by examiner

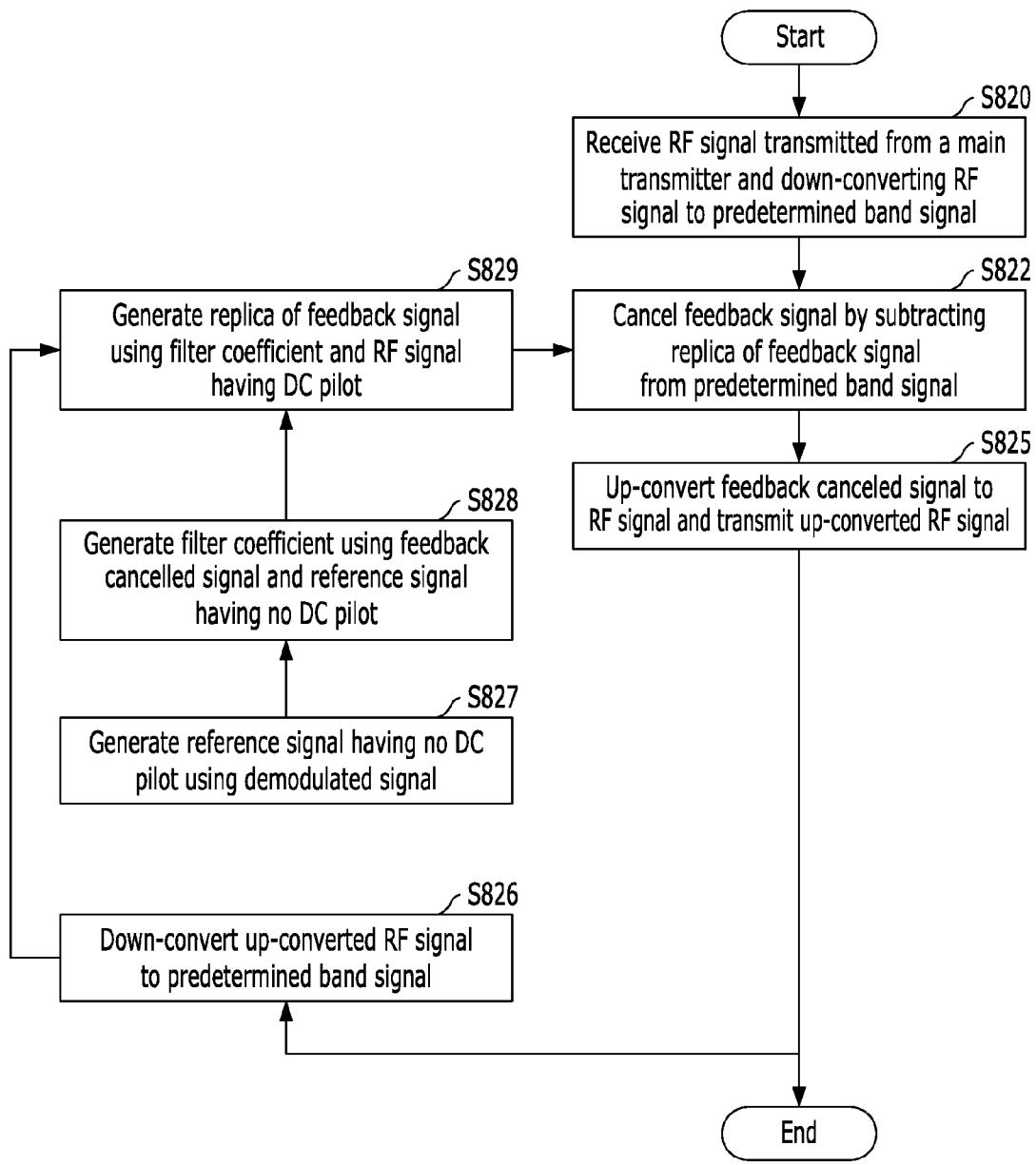

APPARATUS AND METHOD OF FEEDBACK CANCELLATION FOR RADIO SIGNAL

CROSS-REFERENCES TO RELATED APPLICATIONS

The present application claims priority of Korean Patent Application Nos. 10-2009-0088742 and 10-2009-0128534, filed on Sep. 18, 2009, and Dec. 21, 2009, respectively, which are incorporated herein by reference in their entirety.

BACKGROUND OF THE INVENTION

1. Field of the Invention

Exemplary embodiments of the present invention relate to an apparatus and method for cancelling a feedback signal of a radio signal; and, more particularly, to an apparatus and method for cancelling a feedback signal of a radio signal in an on-channel repeater.

2. Description of Related Art

In general, a repeater is an electronic device that receives a signal from a transmitter and retransmits it at higher power. The repeater is generally installed at a fringe area where a signal of a transmitter becomes weak. Such a repeater solves a fringe area problem and expands a transmission area of a transmitter.

In a mobile communication field, a repeater is an auxiliary device that amplifies a weak signal between a base station and user equipment to provide a high speech quality to a user. A repeater was developed as a replacement of a base station and improves a speech quality at a shadow region where a signal of a base station cannot reach. Particularly, a repeater allows a service provider to minimize an investment cost because a repeater requires inexpensive installation and maintenance cost and occupies a small area.

In a mobile communication system, a repeater was introduced as a technology for overcoming a fringe area problem. Lately, a repeater has been widely used. Although a repeater was developed to have a limited and simple function of amplifying a signal, a repeater has been advanced to have multiple intelligent functions. That is, a repeater becomes a core technology for expanding a service coverage area and improving a data processing rate as well as reducing costs for installing base stations and maintaining a backbone communication network. As the advancement of a repeater technology, a new wireless communication system is required to support a typical repeater used in an existing wireless communication system.

FIG. 1 is a diagram illustrating a service provided using typical repeaters. In FIG. 1, a plurality of repeaters 102-105 use different frequencies to relay signals from a main transmitter 101.

As shown in FIG. 1, a main transmitter 101 transmits a signal with a frequency A. Each repeater 102 to 105 relays the signal from the main transmitter 101 using frequencies B, C, D, and E different from the transmission frequency A of the main transmitter 101. Since the repeaters 102 to 105 use different frequencies B, C, D, and E, it is necessary to allocate a plurality of frequency bands. Such a relaying method is ineffective in a view of frequency usage.

FIG. 2 is a diagram illustrating a service using on-channel repeaters. In FIG. 2, a plurality of repeaters use the same frequency.

As shown in FIG. 2, a main transmitter 201 transmits a signal through a frequency A. A plurality of on-channel repeaters 202 to 205 relay a signal using a frequency A which is identical to the transmission frequency A of the main transmitter 201. Such on-channel repeaters 202 to 205 cancel noises of a Radio Frequency (RF) signal transmitted from the main transmitter 201 by converting the RF signal to a baseband signal. After cancelling noise from the RF signal, the on-channel repeaters 202 to 205 modulates the noise cancelled signal to a RF signal and relay the RF signal using the same channel.

In order to stably provide such a service, a feedback signal cancellation apparatus of an on-channel repeater must be capable of suppressing a feedback signal below a predetermined level that guarantees a stable reception performance of a receiver. The feedback signal is generated due to a feedback channel formed between a transmission antenna and a reception antenna of a repeater. Also, the feedback signal cancellation apparatus must minimize a spectrum distortion of a restored signal in order to assure the stable operation of an on-channel repeater and a receiver.

Hereinafter, drawbacks of a typical feedback signal cancellation apparatus of an on-channel repeater will be described with reference to FIG. 3.

FIG. 3 is a diagram illustrating a typical feedback signal cancellation apparatus of an on-channel repeater.

Referring to FIG. 3, a typical feedback signal cancellation apparatus includes a reception antenna 301, a first Radio Frequency (RF) receiver 302, a subtractor 303, a replica generator 304, a second RF receiver 305, a RF transmitter 306, and a transmission antenna 307. The reception antenna 301 receives a RF signal transmitted from a main transmitter (not shown). The first RF receiver 302 down-converts the received RF signal to a predetermined band. The subtractor 303 receives the down-converted signal from the first RF receiver 302 and cancels a feedback signal from the down-converted signal by subtracting a replica of a feedback signal from the down-converted signal.

The RF transmitter 306 receives the feedback cancelled signal from the subtractor 303 and converts the feedback cancelled signal to a RF transmission signal as a repeater output signal. The RF transmitter 306 transmits the RF transmission signal through the transmission antenna 307.

The second RF receiver 305 receives the RF transmission signal from the RF transmitter 306 and down-converts the received RF transmission signal to a predetermined frequency band. That is, the second RF receiver 305 down-converts the RF transmission signal received from the RF transmitter 306 to a signal having the same frequency band as that of the down-converted signal outputted from the first RF receiver 302. Then, the second RF receiver 305 outputs the down-converted signal to the replica generator 304. The replica generator 304 generates a replica of the feedback signal based on the feedback cancelled signal from the subtractor 303 and the repeater output signal from the second RF receiver 305. The replica generator 304 feeds back the generated replica to the subtractor 303 to cancel the feedback signal.

FIG. 4 is a detailed diagram illustrating a feedback cancellation apparatus of an on-channel repeater of FIG. 3.

In FIG. 4, a reception antenna 401, a first RF receiver 402, a subtractor 403, a second RF receiver 407, a RF transmitter 408, and a transmission antenna 409 correspond to the reception antenna 301, the first RF receiver 302, the subtractor 303, the second RF receiver 305, the RF transmitter 306, and the transmission antenna 307 of FIG. 3. Accordingly, the detailed descriptions thereof are omitted herein.

Referring to FIG. 4, the replica generator 406 includes an adaptive filter 404 and a filter coefficient generator 405.

The filter coefficient generator 405 generates a filter coefficient based on a feedback cancelled signal from the subtractor 403 and a repeater output signal from the RF receiver 407.

The adaptive filter 404 receives the filter coefficient from the filter coefficient generator 405 and the repeater output signal from the second RF receiver 407, and generates a replica of a feedback signal using the filter coefficient and the repeater output signal. After generating the replica, the adaptive filter 404 feeds the replica back to the subtractor 403.

The filter coefficient generator 405 uses a Least Mean Square (LMS) adaptive algorithm to calculate the filter coefficient h(n). Particularly, the filter coefficient generator 405 uses Equation 1 below.

$$h(n)=h(n-1)+\mu \cdot e^*(n) \cdot y(n)$$

$$h(n)=[h_0(n)h_1(n)\ldots h_{M-1}(n)]^T$$

$$h(n-1)=[h_0(n-1)h_1(n-1)\ldots h_{M-1}(n-1)]^T$$

$$y(n)=[y(n)y(n-1)\ldots y(n-M+1)]^T \quad \text{Eq. 1}$$

where, e(n) represents the feedback cancelled signal from the subtractor 403, h(n−1) represents a previous filter coefficient, y(n) is the repeater output signal vector which is received at the second RF receiver 407, μ represents a constant deciding a convergence speed, M represents a length of a filter,

* denotes a complex conjugate, and

T denotes a transpose.

The adaptive filter 404 calculates a replica r(n) of a feedback signal by filtering the repeater output signal vector y(n), which is received at the second RF receiver 407 based on the filter coefficient h(n) generated by the filter coefficient generator 405. Particularly, the adaptive filter 404 uses Equation 2 below.

$$r(n)=h_n^T y(n) \quad \text{Eq. 2}$$

The subtractor 403 cancels the feedback signal by subtracting the replica r(n) from the output signal x(n) of the first RF receiver 402 using Equation 3 below.

$$e(n)=x(n)-r(n) \quad \text{Eq. 3}$$

As shown, the typical feedback signal cancellation apparatus of FIG. 3 suppresses the feedback signal below a predetermined level that assures a stable performance of an inner equalizer. However, the typical feedback signal cancellation apparatus of FIG. 3 causes distortion of a restored signal due to the influence of a DC pilot of a vestigial side band (VSB) signal.

Such a spectrum distortion problem of the typical on-channel repeater may deteriorate the overall performance of an on-channel repeater and a receiver.

Accordingly, in order to stably provide a service through an on-channel repeater, it is required to develop a technology for minimizing the spectrum distortion of the restored signal of the feedback signal cancellation apparatus and suppressing feedback signals below a predetermined level that assures a stable performance of a receiver at the same time.

SUMMARY OF THE INVENTION

An embodiment of the present invention is directed to an apparatus and method for cancelling a feedback signal of an on-channel repeater, which minimizes spectrum distortion caused by a DC pilot signal of a signal restored through a feedback signal cancellation apparatus.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for cancelling a feedback signal of an on-channel repeater includes: an antenna configured to receive a Radio Frequency (RF) signal; a first Radio Frequency (RF) receiver configured to down-convert the received RF signal to a predetermined frequency band; a subtractor configured to generate a feedback cancelled signal by subtracting a replica of a feedback signal from the down-converted signal of the first RF receiver; a transmission signal generator configured to generate a repeater output signal using the feedback cancelled signal of the subtractor; a RF transmitter configured to wirelessly transmit the repeater output signal of the transmission signal generator; a second RF receiver configured to down-convert a RF signal outputted from the RF transmitter to a predetermined frequency band; a reference signal generator configured to receive the RF signal output from the RF transmitter and generate a reference signal having no DC pilot; and a replica generator configured to generate a filter coefficient using correlation between the feedback cancelled signal of the subtractor and the reference signal of the reference signal generator and to generate a replica of the feedback signal using the generated filter coefficient and the down-converted signal of the second RF receiver.

In accordance with another embodiment of the present invention, a method for cancelling a feedback signal of an on-channel repeater includes: receiving Radio Frequency (RF) signals and generating a first down-converted signal by down-converting the received RF signals to a predetermined frequency band; outputting a feedback cancelled signal by subtracting a replica of a feedback signal from the first down-converted signal; demodulating the feedback cancelled signal to a baseband symbol through matching filtering; generating a RF transmission signal to be transmitted from the on-channel repeater by inserting DC pilot into the demodulated baseband symbol and modulating the DC pilot inserted baseband symbol through Vestigial Side Band (VSB) modulation and transmitting the RF transmission signal; receiving the RF transmission signal and generating a second down-converted signal by down-converting the RF transmission signal to the predetermined frequency band; generating a reference signal having no pilot from the demodulated baseband symbol; generating a filter coefficient using correlation between the first down-converted signal and the generated reference signal; and generating the replica of a feedback signal by adaptively filtering the second down-converted signal using the generated filter coefficient.

BRIEF DESCRIPTION OF THE DRAWINGS

FIG. 8B is a flowchart showing a method for cancelling a feedback signal of an on-channel repeater in accordance with another embodiment of the present invention.

DESCRIPTION OF SPECIFIC EMBODIMENTS

Figure 1:
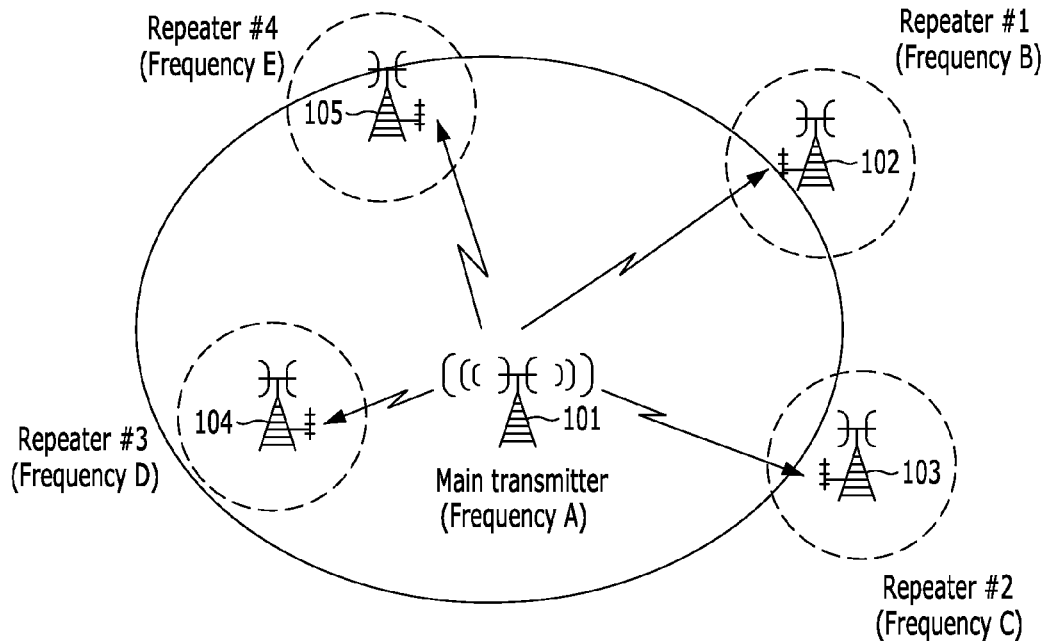
FIG. 1 is a diagram illustrating a service using typical repeaters.
Figure 2:
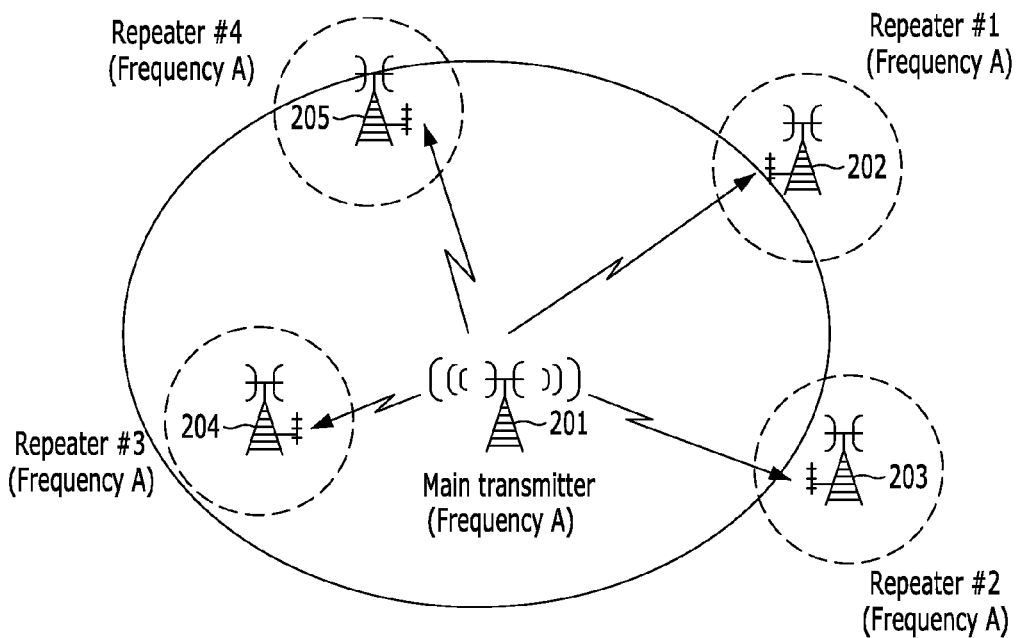
FIG. 2 is a diagram illustrating a service using on-channel repeaters.
Figure 3:
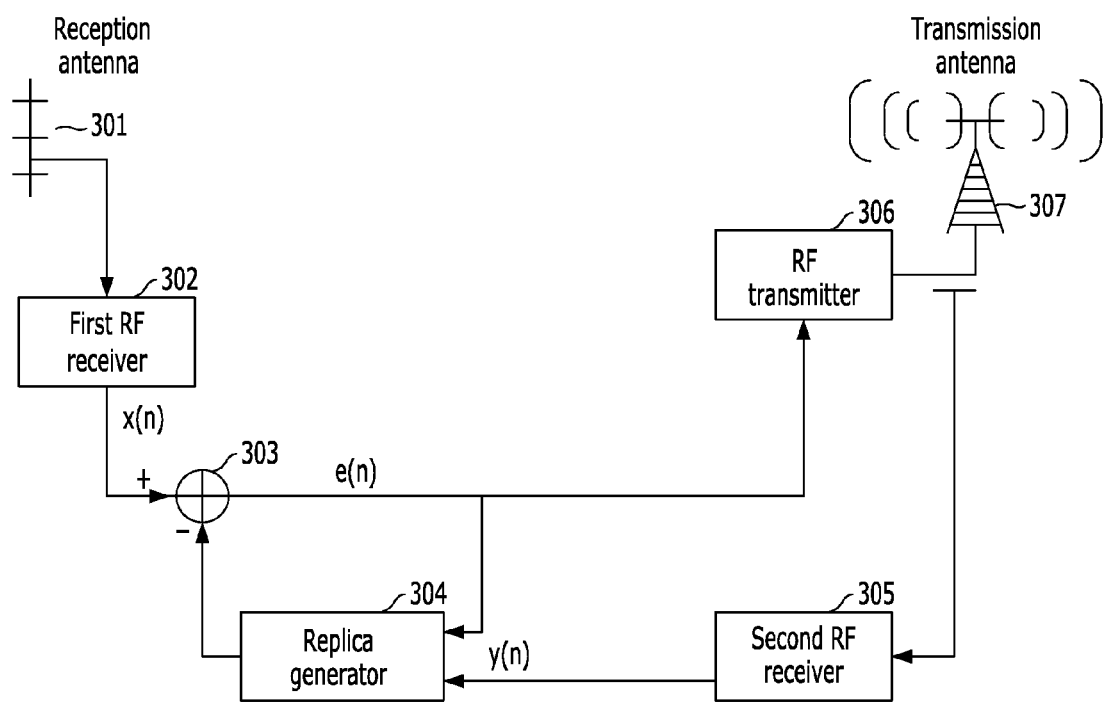
FIG. 3 is a diagram illustrating a typical feedback signal cancellation apparatus of an on-channel repeater.
Figure 4:
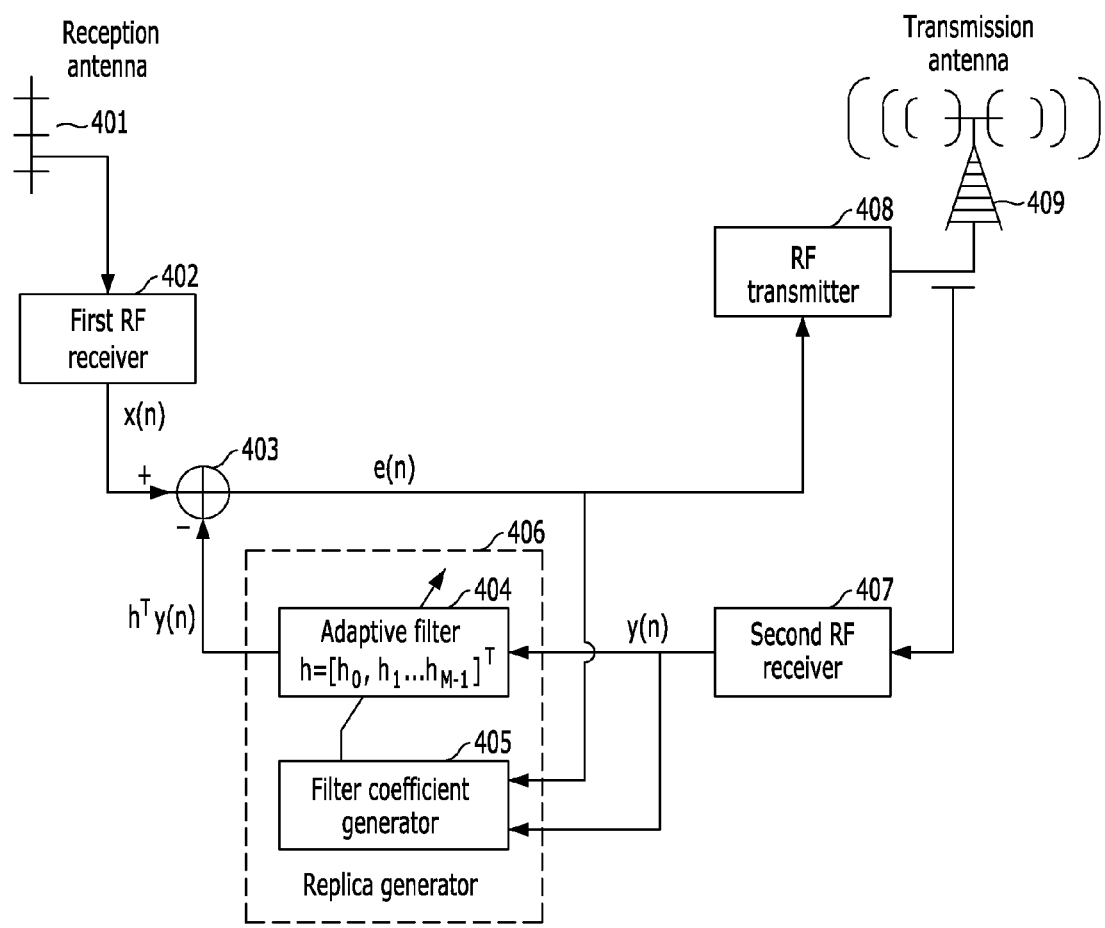
FIG. 4 is a detailed diagram illustrating a feedback cancellation apparatus of an on-channel repeater of FIG. 3.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 5A:
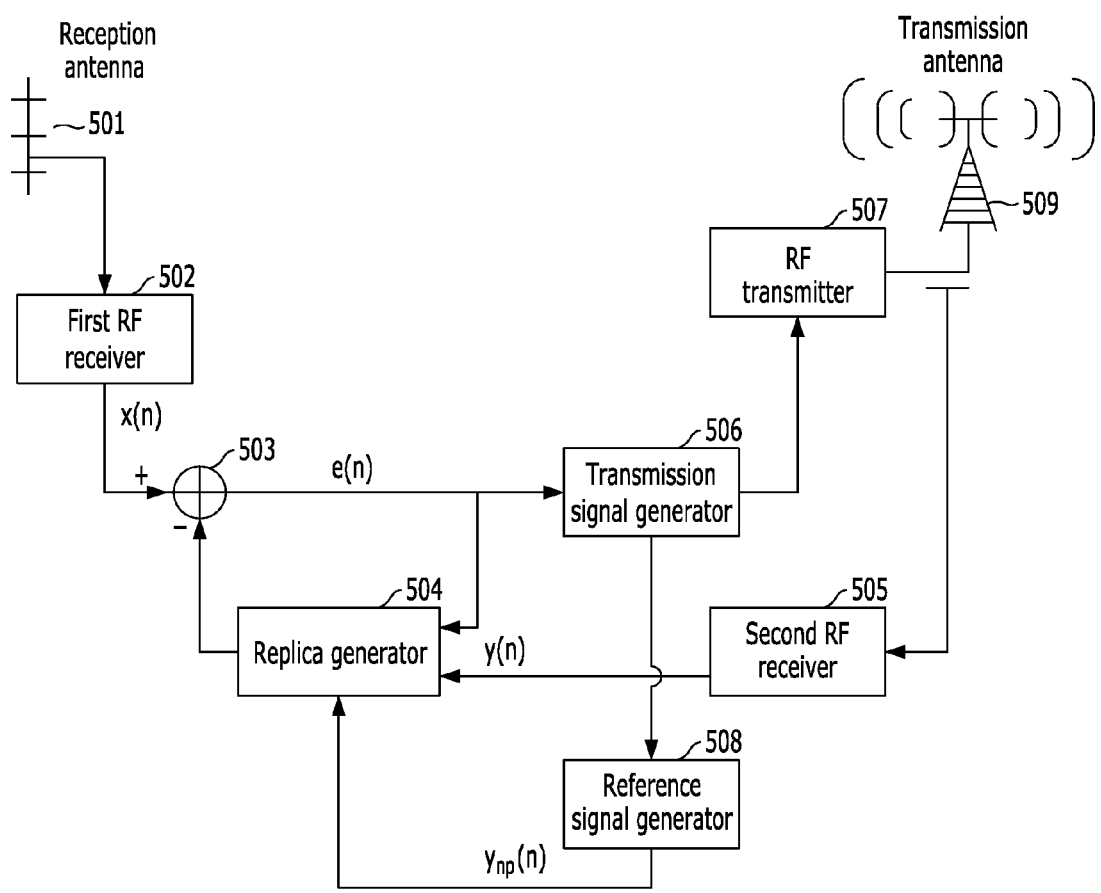
FIG. 5A is a diagram illustrating an apparatus for cancelling a feedback signal of an on-channel repeater in accordance with an embodiment of the present invention.

FIG. 5A is a diagram illustrating an apparatus for cancelling a feedback signal of an on-channel repeater in accordance with an embodiment of the present invention.

Referring to FIG. 5A, the feedback signal cancellation apparatus in accordance with an embodiment of the present invention includes a reception antenna 501, a first Radio Frequency (RF) receiver 502, a subtractor 503, a replica generator 504, a second RF receiver 505, a transmission signal generator 506, a RF transmitter 507, a reference signal generator 508, and a transmission antenna 509. The first RF receiver 502 down-converts a RF signal received at the reception antenna 501 to a predetermined band signal. The subtractor 503 cancels a feedback signal from the down-converted signal of the first RF receiver 502 by subtracting a replica of a feedback signal from the down-converted signal.

In order to minimize the spectrum distortion of an output signal of a typical feedback cancellation apparatus as well as suppressing a feedback signal below a predetermined level assuring an overall performance of an inner equalizer, the replica generator 504 generates a replica using a repeater output signal received at the second RF receiver 505 and a reference signal having no pilot from the reference signal generator 508.

The replica generator 504 feeds the generated replica back to the subtractor 503. The transmission signal generator 506 converts the feedback cancelled signal of the subtractor 503 to a transmission signal.

The RF transmitter 507 receives the transmission signal from the transmission signal generator 506 and wirelessly transmits the transmission signal through the transmission antenna 509.

The reference signal generator 508 generates a reference signal having no pilot using an output signal of the transmission generator 506. The reference signal having no pilot is used in the replica generator 504.

Figure 5B:
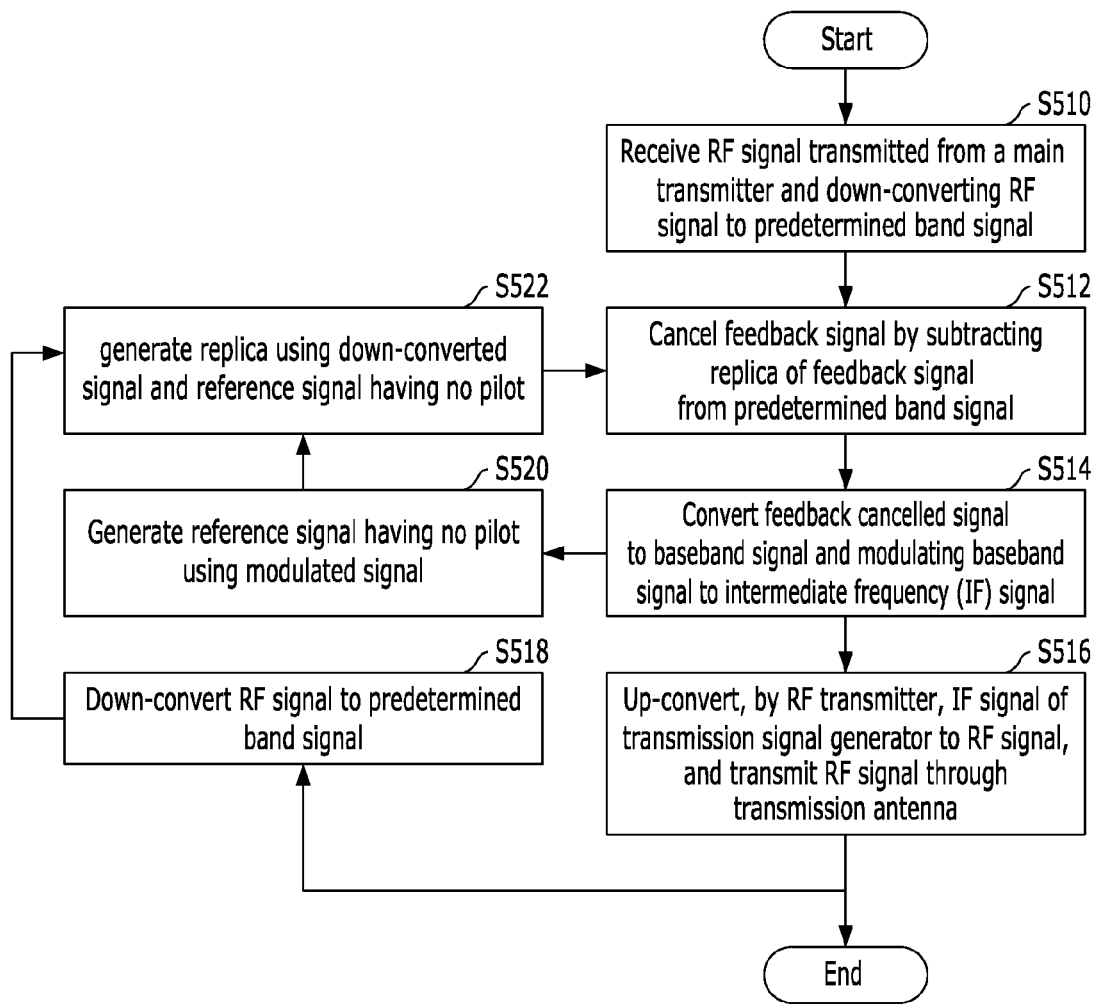
FIG. 5B is a flowchart showing a method for cancelling a feedback signal of an on-channel repeater in accordance with an embodiment of the present invention.

FIG. 5B is a flowchart showing a method for cancelling a feedback signal of an on-channel repeater in accordance with an embodiment of the present invention.

At step S510, the first RF receiver 502 receives a RF signal transmitted from a main transmitter through the reception antenna 501 and down-converts the received RF signal to a predetermined band signal. At step S512, the subtractor 503 cancels a feedback signal by subtracting a replica of a feedback signal from the down-converted signal of the first RF receiver 502. At step S514, the transmission signal generator 506 converts the feedback cancelled signal to a baseband signal and modulates the baseband signal to an intermediate frequency (IF) signal. At step S516, the RF transmitter 507 up-converts the IF signal of the transmission signal generator 506 to a RF signal and transmits the RF signal as the repeater output signal through the transmission antenna 509.

At step S518, the second RF receiver 505 down-converts the RF signal of the RF transmitter 507 to a predetermined band signal.

At step S520, the reference signal generator 509 generate a reference signal having no pilot using the transmission signal generated by the transmission signal generator 506. Here, the reference signal having no pilot is used in the replica generator 504.

At step S522, the replica generator 504 generates the replica using the RF signal received at the second RF receiver 505 and the reference signal having no pilot. The replica generator 504 feeds the generated replica back to the subtractor 503 to cancel the feedback signal.

Figure 6A:
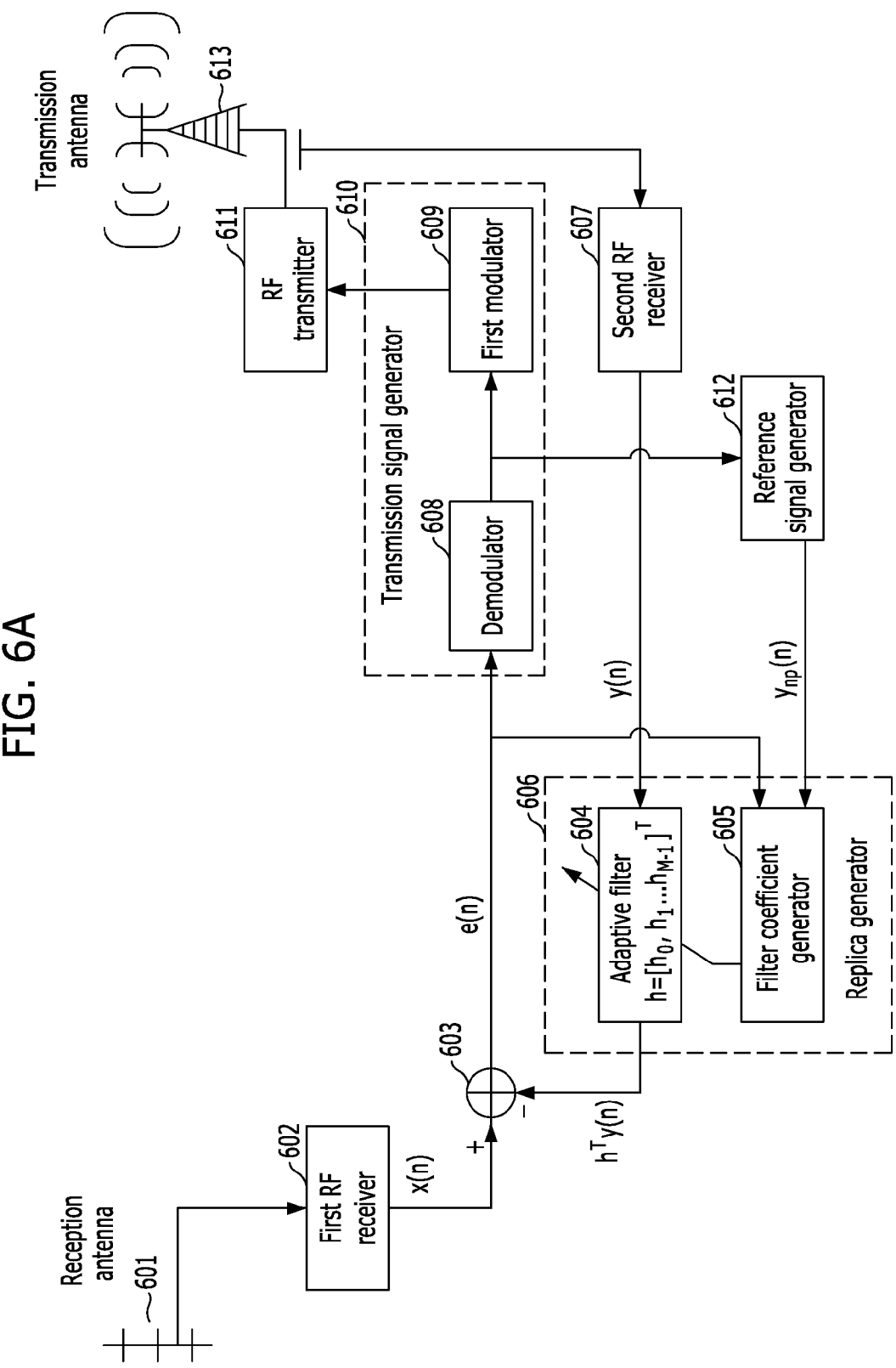
FIG. 6A is a diagram illustrating an apparatus for cancelling a feedback signal of an on-channel repeater in accordance with an embodiment of the present invention.

FIG. 6A is a diagram illustrating an apparatus for cancelling a feedback signal of an on-channel repeater in accordance with an embodiment of the present invention.

FIG. 6A is a detailed diagram of the feedback signal cancellation apparatus of FIG. 5A. In FIG. 6A, a reception antenna 601, a first RF receiver 602, a subtractor 603, a second RF receiver 607, a reference signal generator 612, a RF transmitter 611, and a transmission antenna 613 correspond to the reception antenna 501, the first RF receiver 502, the subtractor 503, the second RF receiver 505, the reference signal generator 508, the RF transmitter 507, and the transmission antenna 509 of FIG. 5A. Therefore, the detailed descriptions thereof are omitted herein.

The replica generator 606 includes an adaptive filter 604 and a filter coefficient generator 605. The filter coefficient generator 606 extracts information on a feedback channel using correlation between the feedback cancelled signal of the subtractor 603 and the reference signal of the reference signal generator 612 and generates a filter coefficient using the extracted information.

The adaptive filter 604 generates a replica using the generated filter coefficient of the filter coefficient generator 605 and the RF signal received at the second RF receiver 607.

The filter coefficient generator 605 uses a Least Mean Square (LMS) algorithm to calculate the filter coefficient h(n). Particularly, the filter coefficient generator 605 uses Equation 4 below.

$$h(n) = h(n-1) + \mu \cdot e^*(n) \cdot y_{np}(n)$$

$$h(n) = [h_0(n) h_1(n) \ldots h_{M-1}(n)]^T$$

$$h(n-1)=[h_0(n-1)h_1(n-1)\ldots h_{M-1}(n-1)]^T$$

$$y_{np}(n)=[y_{np}(n)y_{np}(n-1)\ldots y_{np}(n-M+1)]^T \quad \text{Eq. 1}$$

where, e(n) represents the feedback cancelled signal of the subtractor 603, h(n−1) represents a previous filter coefficient, y(n) is a RF signal vector received at the second RF receiver 607, μ represents a constant deciding a convergence speed, M represents a length of a filter,

* denotes a complex conjugate, and

T denotes a transpose.

The adaptive filter 604 calculates a replica r(n) of a feedback signal by filtering the received RF signal y(n) of the second RF receiver 607 based on the generated filter coefficient h(n). Particularly, the adaptive filter 604 uses Equation 5 below.

$$r(n)=h_n^T \cdot y(n) \quad \text{Eq. 5}$$

The generated replica is fed back to the subtractor 603.

The transmission signal generator 610 includes a demodulator 608 and a modulator 609. The demodulator 608 demodulates the feedback cancelled signal to a baseband symbol through matching filtering.

The modulator 609 inserts a DC pilot into the baseband symbol and modulates the DC pilot inserted baseband symbol through VSB modulation. The RF transmitter 611 converts the modulated signal of the modulator 609 to a RF signal and transmits the RF signal through the transmission antenna 613 as the repeater output signal.

Meanwhile, the filter coefficient generator 605 generates a reference signal having on DC pilot using the demodulated signal of the demodulator 608 through the reference signal generator 612.

The reference signal having no pilot generated by the reference signal generator 612 is used as input of the filter coefficient generator 605 for estimating a filter coefficient.

The filter coefficient generator 605 generates a filter coefficient using the feedback cancelled signal of the subtractor 603 and the reference signal having no pilot from the reference signal generator 612.

The adaptive filter 604 generates a replica of a feedback signal using the filter coefficient from the filter coefficient generator 605 and the RF signal having DC pilot received at the second RF receiver 407. The replica generated by the adaptive filter 604 is fed back to the subtractor 603 and the subtractor 603 uses the replica to cancel a feedback signal.

Figure 6B:
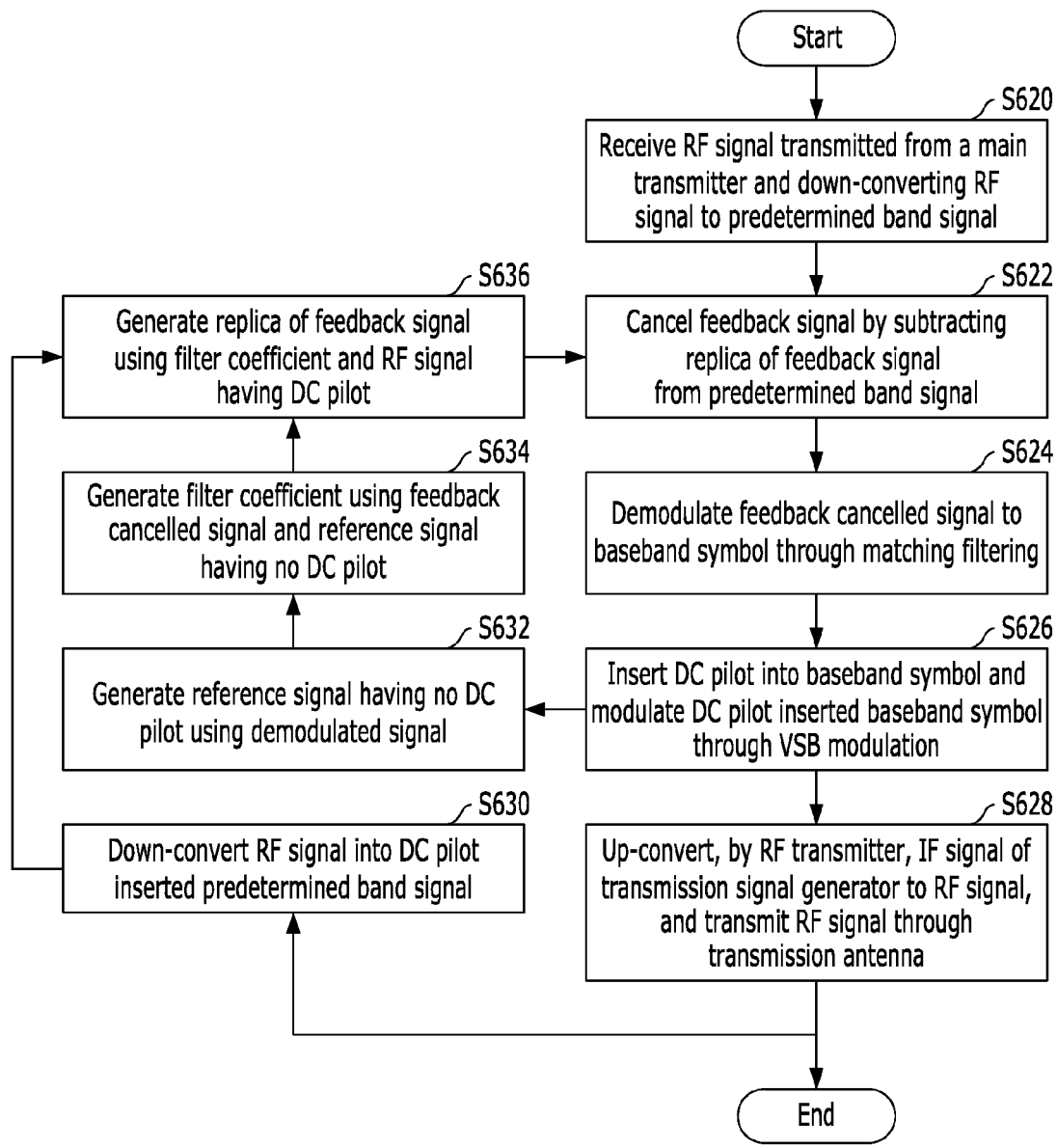
FIG. 6B is a flowchart illustrating a method for cancelling a feedback signal of an on-channel repeater in accordance with an embodiment of the present invention.

FIG. 6B is a flowchart illustrating a method for cancelling a feedback signal of an on-channel repeater in accordance with an embodiment of the present invention.

At step S620, the first RF receiver 602 receives a RF signal through the reception antenna 601. Here, the RF signal is transmitted from a main transmitter (not shown). The first RF receiver 602 down-converts the RF signal into a predetermined band signal. At step S622, the subtractor 603 cancels a feedback signal from the down-converted signal of the first RF receiver 602 by subtracting the replica of the feedback signal from the down-converted signal.

At step S624, the demodulator 608 demodulates the feedback cancelled signal to a baseband symbol through matching filtering. At step S626, the modulator 609 inserts DC pilot into the baseband symbol and modulates the DC pilot inserted baseband symbol through VSB modulation. At step S628, the RF transmitter 611 up-converts the modulated signal of the modulator 609 to a RF signal and transmits the RF signal through the transmission antenna 613.

At step S630, the second RF receiver 607 receives the RF signal of the RF transmitter 611 and down-converts the RF signal into a DC pilot inserted predetermined band signal. At step S632, the reference signal generator 612 generates a reference signal having no DC pilot using the demodulated signal from the demodulator 608.

At step S634, the filter coefficient generator 605 generates a filter coefficient using the feedback cancelled signal of the subtractor 603 and the reference signal having no DC pilot from the reference signal generator 612.

At step S636, the adaptive filter 604 generates a replica of a feedback signal using the filter coefficient from the filter coefficient generator 605 and the RF signal having DC pilot received at the second RF receiver 607. At step S622, the replica is fed back to the subtractor 603 to cancel the feedback signal.

Figure 7A:
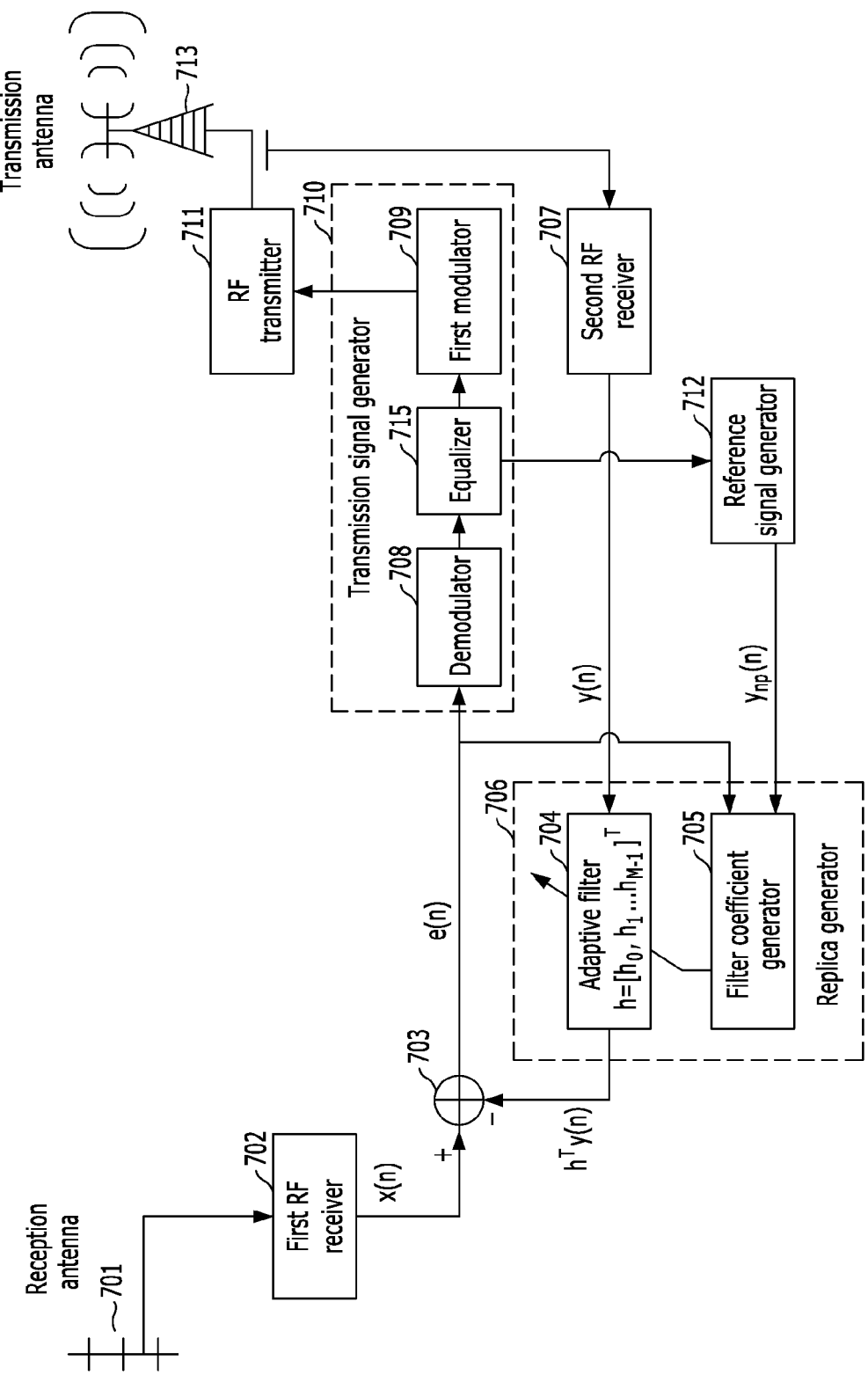
FIG. 7A is a diagram illustrating a feedback cancellation apparatus of an on-channel repeater in accordance with another embodiment of the present invention.

FIG. 7A is a diagram illustrating a feedback cancellation apparatus of an on-channel repeater in accordance with another embodiment of the present invention.

In FIG. 7A, a reception antenna 701, a first RF receiver 702, a subtractor 703, a second RF receiver 707, a reference signal generator 712, a RF transmitter 711, and a transmission antenna 713 correspond to the reception antenna 601, the first RF receiver 602, the subtractor 603, the second RF receiver 607, the reference signal generator 612, the RF transmitter 611, and the transmission antenna 613 of FIG. 6. Accordingly, the detailed descriptions thereof are omitted herein.

Unlike the feedback signal cancellation apparatus of FIG. 6A, the feedback signal cancellation apparatus of FIG. 7A further include an equalizer 715 in the transmission signal generator 710. Particularly, the transmission signal generator 710 includes a demodulator 708, an equalizer 715, and a modulator 709.

The demodulator 708 converts a feedback cancelled signal from the subtractor 603 to a baseband signal. The equalizer 715 compensates a signal distorted by a main transmission channel using the demodulated baseband symbol, generates 8-level baseband symbol and outputs the generated baseband symbol to the demodulator 709 and the reference signal generator 712.

The modulator 709 inserts DC pilot to the 8-level baseband signal of the equalizer 715, converts the DC pilot inserted baseband signal to an intermediate frequency (IF) signal, and modulates the IF signal through VSB modulation. The RF transmitter 711 converts the modulated signal to a RF signal as a repeater output signal and transmits the RF signal through the transmission antenna 713.

The replica generator 706 extracts information on a feedback channel using correlation between the feedback cancelled signal of the subtractor 703 and the reference signal having no pilot from the reference signal generator 712.

The replica generator 706 includes a filter coefficient generator 705 and an adaptive filter 704. The filter coefficient generator 705 generates a filter coefficient using the extracted information. The adaptive filter 704 generates a replica signal using the generated filter coefficient from the filter coefficient generator 705 and the RF signal having DC pilot received at the second RF receiver 707.

The filter coefficient generator 705 uses a Least Mean Square (LMS) adaptive algorithm to calculate a filter coefficient. The adaptive filter 704 calculates a replica of a feedback signal by filtering the received RF signal having DC pilot of the second RF receiver 707 based on the generated filter coefficient. The replica generator 706 feeds the generated replica back to the subtractor 703 to cancel a feedback signal generated at the same channel.

Figure 7B:
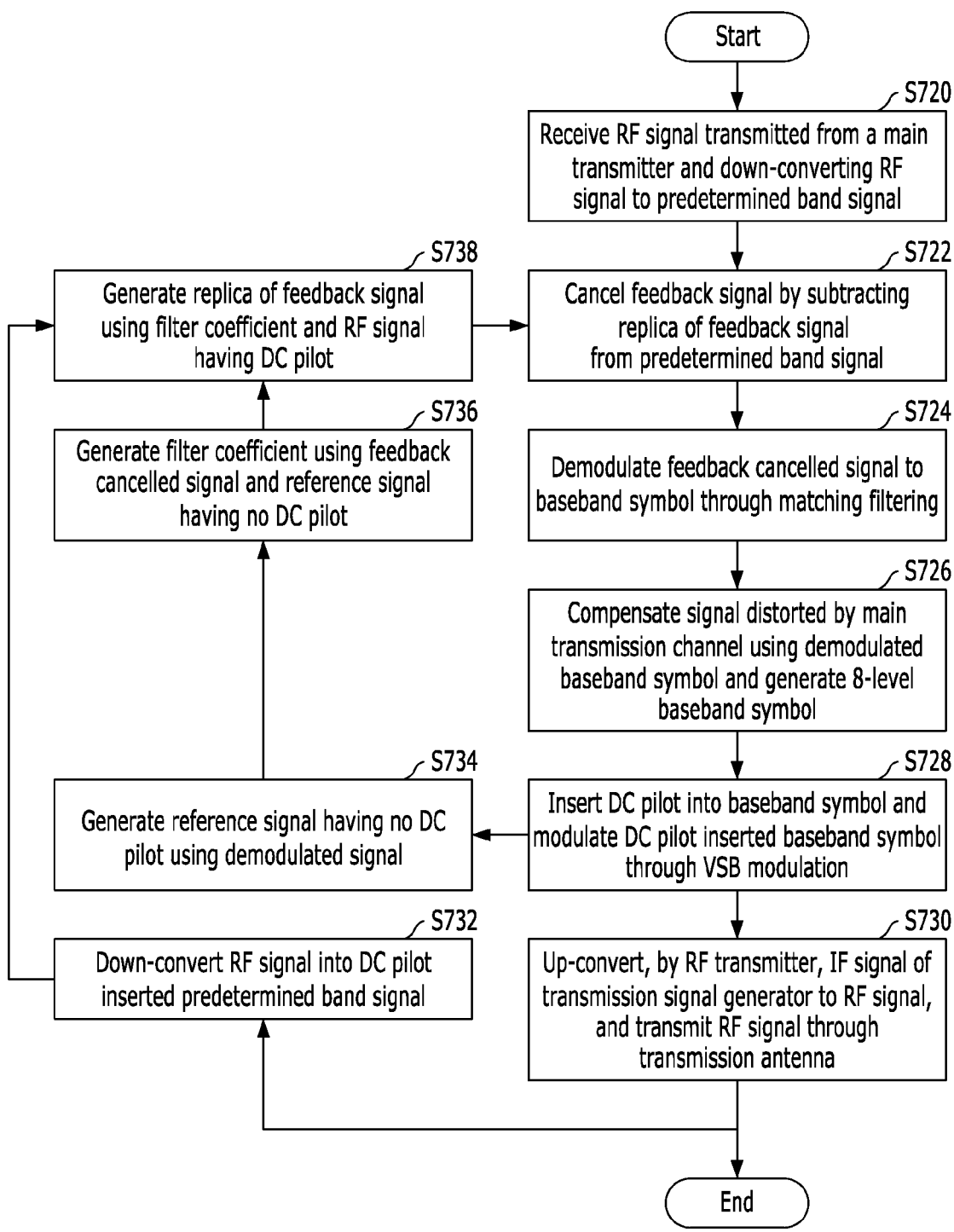
FIG. 7B is a flowchart illustrating a method for cancelling a feedback signal in an on-channel repeater in accordance with another embodiment of the present invention.

FIG. 7B is a flowchart illustrating a method for cancelling a feedback signal in an on-channel repeater in accordance with another embodiment of the present invention.

At step S720, the first RF receiver 702 receives a RF signal transmitted from a main transmitter through the reception antenna 701 and down-converts the received RF signal to a predetermined band signal. At step S722, the subtractor 703 cancels a feedback signal from the down-converted signal of the first RF receiver 702 by subtracting the replica of the feedback signal from the down-converted signal.

At step S724, the demodulator 708 demodulates the feedback cancelled signal to a baseband symbol through matching filtering. At step S726, the equalizer 715 compensates a signal distorted by a main transmission channel using the demodulated baseband symbol and generates 8-level baseband symbol. At step S728, the modulator 709 inserts DC pilot into the 8-level baseband symbol equalized by the equalizer 615, converts the DC pilot inserted baseband symbol to an intermediate frequency (IF) signal, and modulates the DC pilot inserted IF signal through VSB modulation.

At step S730, the RF transmitter 711 up-converts the modulated IF signal of the modulator 709 to a RF signal and transmits the RF signal through the transmission antenna 713.

At step S732, the second RF receiver 707 receives the RF signal of the RF transmitter 711 and down-converts the received RF signal having DC pilot to a predetermined band signal having DC pilot.

At step S734, the reference signal generator 712 generates a reference signal having no DC pilot using the demodulated signal of the demodulator 608.

At step S736, the filter coefficient generator 705 generates a filter coefficient using the feedback cancelled signal of the subtractor 703 and the reference signal having no DC pilot from the reference signal generator 712.

At step S738, the adaptive filter 604 receives the filter coefficient from the filter coefficient generator 605 and the RF signal having DC pilot from the second RF receiver 607 and generates a replica of a feedback signal using the received filter coefficient and the received RF signal DC pilot. At step S722, the adaptive filter 604 feeds the replica back to the subtractor 703 to cancel the feedback signal.

Figure 8A:
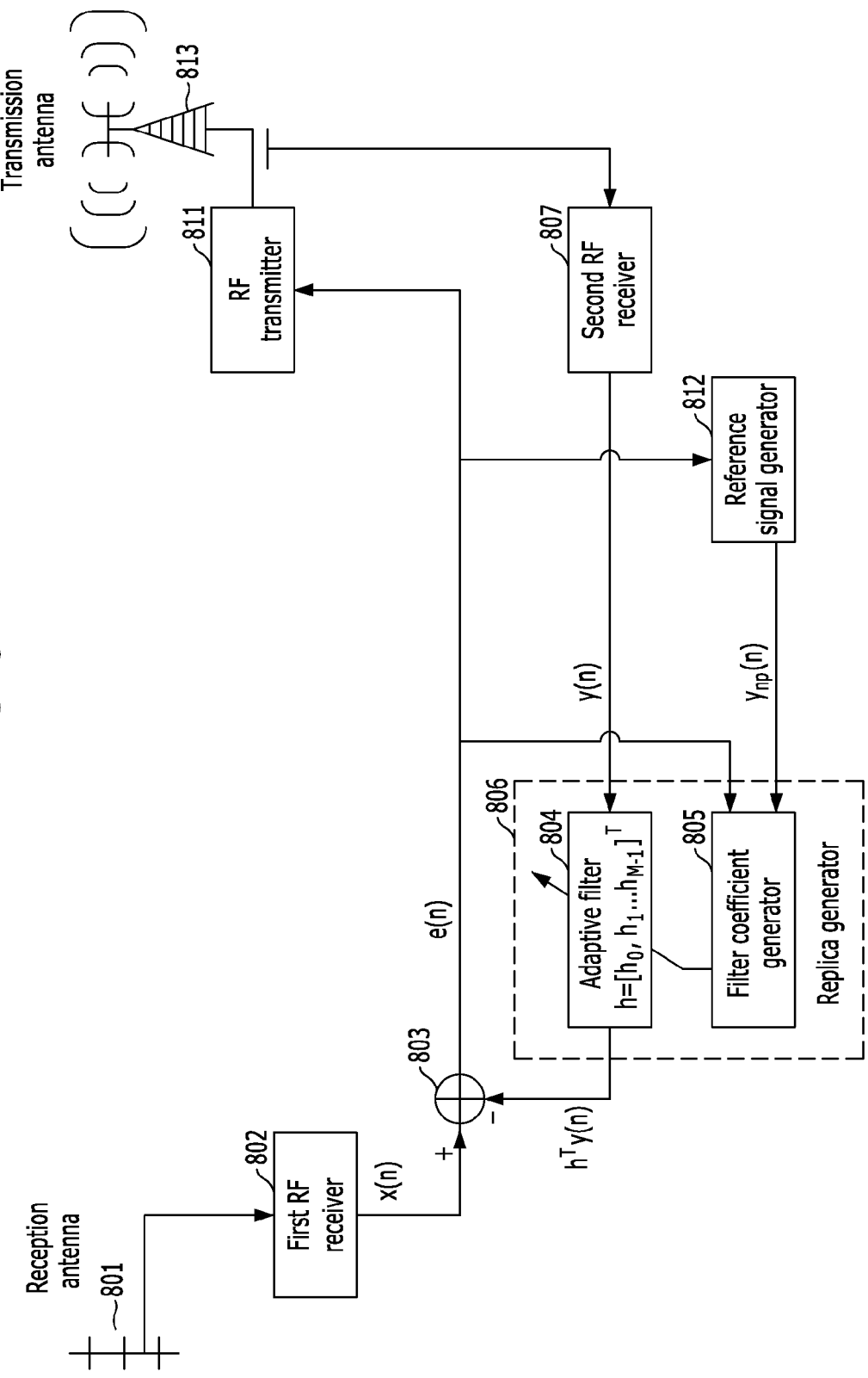
FIG. 8A is a diagram illustrating a feedback signal cancellation apparatus of an on-channel repeater in accordance with another embodiment of the present invention.

FIG. 8A is a diagram illustrating a feedback signal cancellation apparatus of an on-channel repeater in accordance with another embodiment of the present invention In FIG. 8A, a reception antenna 801, a first RF receiver 802, a subtractor 803, a second RF receiver 807, a reference signal generator 812, a RF transmitter 811, and a transmission antenna 813 correspond to the first RF receiver 602, the subtractor 603, the second RF receiver 605, the reference signal generator 608, the RF transmitter 605, and the transmission antenna 509 of FIG. 6A. Accordingly, the detailed descriptions thereof are omitted herein.

Hereinafter, only different constituent elements between feedback signal cancellation apparatuses of FIG. 8A and FIG. 6A will be described briefly.

The feedback signal cancellation apparatus of FIG. 8A converts a feedback cancelled signal output from the subtractor 803 to a RF signal through the RF transmitter 811 without demodulating and modulating the feedback cancelled signal. Then, the feedback signal cancellation apparatus of FIG. 8A transmits the RF signal through the RF transmitter 811 and the transmission antenna 813. That is, the reference signal generator 812 generates a reference signal having no DC pilot using the feedback cancelled signal of the subtractor 803.

The generated reference signal of the reference signal generator is used as input of the filter coefficient generator 805 to estimate a filter coefficient. The filter coefficient generator 805 generates the filter coefficient using the feedback cancelled signal output from the subtractor 803 and the reference signal having no DC pilot from the reference signal generator 812.

The adaptive filter 804 generates a replica of a feedback signal using the filter coefficient from the filter coefficient generator 805 and the RF signal having DC pilot from the RF receiver 807. The adaptive filter 804 feeds the generated replica back to the subtractor 803 to cancel a feedback signal.

FIG. 8B is a flowchart showing a method for cancelling a feedback signal of an on-channel repeater in accordance with another embodiment of the present invention At step S820, the first RF receiver 802 receives a RF signal transmitted from a main transmitter through the reception antenna 801 and converts the received RF signal to a predetermined band signal. At step S822, the subtractor 803 cancels a feedback signal by subtracting a replica of a feedback signal from a down-converted signal from the RF receiver 802.

At step S825, the RF transmitter 811 up-converts the feedback cancelled signal to a RF signal and transmits the RF signal through the transmission antenna 813.

At step S826, the second RF receiver 807 receives the RF signal from the RF transmitter 811 and down-converts the RF signal to a predetermined band signal.

At step S827, the reference signal generator 812 generates a reference signal having no DC pilot using the feedback cancelled signal from the subtractor 803.

At step S828, the filter coefficient generator 705 generates a filter coefficient using the feedback cancelled signal from the subtractor 703 and the reference signal having no DC pilot from the reference signal generator 712.

At step S829, the adaptive filter 804 generates a replica of a feedback signal using the filter coefficient of the filter coefficient generator 805 and the output signal of the second RF receiver 807.

As described above, the present invention relates to an apparatus and method for cancelling a feedback signal in an on-channel repeater of a broadcasting and communication system that generates a transmission signal having DC pilot. In order to cancel a feedback signal generated by a feedback channel formed between a transmission antenna and a reception antenna of a repeater, the feedback signal cancellation apparatus and method in accordance with an embodiment of the present invention estimates a feedback channel using a reference signal having no DC pilot and uses the estimated channel information. Accordingly, the feedback signal cancellation apparatus and method in accordance with an embodiment of the present invention suppresses the generation of the feedback signal below a predetermined level that assures a certain performance of the repeater and a receiver and minimizes the spectrum distortion caused by DC pilot of a restored signal.

The feedback signal cancellation apparatus and method in accordance with an embodiment of the present invention is suitable to an 8-VSB based digital broadcasting service (DTV). However, the present invention is not limited thereto. In general, the feedback signal cancellation apparatus and method in accordance with an embodiment of the present invention can be applied to any network environments requiring repeaters for a typical single frequency network.

The feedback signal cancellation apparatus and method in accordance with an embodiment of the present invention suppresses the generation of feedback signals below a predetermined level that assures a stable reception performance of a receiver.

Further, the feedback signal cancellation apparatus and method in accordance with an embodiment of the present invention increases a transmission signal power of an on-channel repeater by minimizing the spectrum distortion of a restored signal. Accordingly, a broadcasting service area can be expanded through the feedback signal cancellation apparatus and method in accordance with an embodiment of the present invention.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

What is claimed is:

1. An apparatus for cancelling a feedback signal of an on-channel repeater, comprising:
    an antenna configured to receive a Radio Frequency (RF) signal;
    a first Radio Frequency (RF) receiver configured to down-convert the received RF signal to a predetermined frequency band;
    a subtractor configured to generate a feedback cancelled signal by subtracting a replica of a feedback signal from the down-converted signal of the first RF receiver;
    a transmission signal generator configured to generate a repeater output signal using the feedback cancelled signal of the subtractor;
    a RF transmitter configured to wirelessly transmit the repeater output signal of the transmission signal generator;
    a second RF receiver configured to down-convert a RF signal outputted from the RF transmitter to a predetermined frequency band;
    a reference signal generator configured to receive the RF signal output from the RF transmitter and generate a reference signal having no DC pilot; and
    a replica generator configured to generate a filter coefficient using correlation between the feedback cancelled signal of the subtractor and the reference signal of the reference signal generator and to generate a replica of the feedback signal using the generated filter coefficient and the down-converted signal of the second RF receiver.

2. The apparatus of claim 1, wherein the replica generator comprises:
    a filter coefficient generator configured to extract information on a feedback channel using correlation between a signal restored through the subtractor and the reference signal having no DC pilot of the reference signal generator, and to generate a filter coefficient using the extracted information; and
    an adaptive filter configured to generate a replica of a feedback signal by adaptively filtering the RF signal received through the second RF receiver using the generated filter coefficient.

3. The apparatus of claim 2, wherein the filter coefficient generator calculates a filter coefficient based on a Least Mean Square (LMS) adaptive algorithm.

4. The apparatus of claim 1, wherein the transmission signal generator comprises:
    a demodulator configured to demodulate an output signal of the subtractor to a baseband signal; and
    a modulator configured to insert DC pilot into the baseband signal and modulates the DC pilot inserted baseband signal through Vestigial Side Band (VSB) modulation.

5. The apparatus of claim 4, wherein the transmission signal generator further comprises:
    an equalizer configured to compensate distortion of a main transmission channel using the demodulated baseband signal.

6. An apparatus for cancelling a feedback signal of an on-channel repeater, comprising:
    an antenna configured to receive a Radio Frequency (RF) signal;
    a first RF receiver configured to down-convert the received RF signal to a predetermined frequency band;
    a subtractor configured to subtract a replica of a feedback signal from the down-converted signal of the first RF receiver;
    a RF transmitter configured to wirelessly transmit the down-converted signal;
    a second RF receiver configured to down-convert a RF signal outputted from the RF transmitter to a predetermined frequency band signal;
    a reference signal generator configured to receive the RF signal outputted from the RF transmitter and to generate a reference signal having no DC pilot; and
    a replica generator configured to generate a filter coefficient using correlation between an output signal of the subtractor and the reference signal generated from the reference signal generator and to generate a replica of the feedback signal using the generated filter coefficient and the down-converted signal of the second RF receiver.

7. The apparatus of claim 6, wherein the replica generator comprises:
    a filter coefficient generator configured to extract information on a feedback channel using correlation between a restored signal through the subtractor and to generate a filter coefficient using the extracted information; and
    an adaptive filter configured to generate a replica of a feedback signal by adaptively filtering the RF signal received through the second RF receiver using the generated filter coefficient.

8. A method for cancelling a feedback signal of an on-channel repeater, comprising:
    receiving Radio Frequency (RF) signals and generating a first down-converted signal by down-converting the received RF signals to a predetermined frequency band;
    outputting a feedback cancelled signal by subtracting a replica of a feedback signal from the first down-converted signal;
    demodulating the feedback cancelled signal to a baseband symbol through matching filtering;
    generating a RF transmission signal to be transmitted from the on-channel repeater by inserting DC pilot into the demodulated baseband symbol and modulating the DC pilot inserted baseband symbol through Vestigial Side Band (VSB) modulation and transmitting the RF transmission signal;

receiving the RF transmission signal and generating a second down-converted signal by down-converting the RF transmission signal to the predetermined frequency band;

generating a reference signal having no pilot from the demodulated baseband symbol;

generating a filter coefficient using correlation between the first down-converted signal and the generated reference signal; and generating the replica of a feedback signal by adaptively filtering the second down-converted signal using the generated filter coefficient.

9. The method of claim 8, wherein in said generating a filter coefficient,
- a Least Mean Square (LMS) adaptive algorithm is used to calculate the filter coefficient.

10. The method of claim 8, wherein said generating a RF signal further comprises compensating distortion of a main transmission channel using the demodulated baseband symbol.

11. A method for cancelling a feedback signal of an on-channel repeater, comprising:

receiving Radio Frequency (RF) signals and generating a first down-converted signal by down-converting the received RF signals to a predetermined frequency band;

outputting a feedback cancelled signal by subtracting a replica from the first down-converted signal;

generating a RF transmission signal to be transmitted from the on-channel repeater using the feedback cancelled signal;

receiving the RF transmission signal and generating a second down-converted signal by down-converting the RF transmission signal to the predetermined frequency band;

generating a reference signal having no pilot from the demodulated baseband symbol;

generating a filter coefficient using correlation between the first down-converted signal and the generated reference signal; and generating the replica of the feedback signal by adaptively filtering the second down-converted signal using the generated filter coefficient.

* * * * *